Patented Feb. 9, 1937

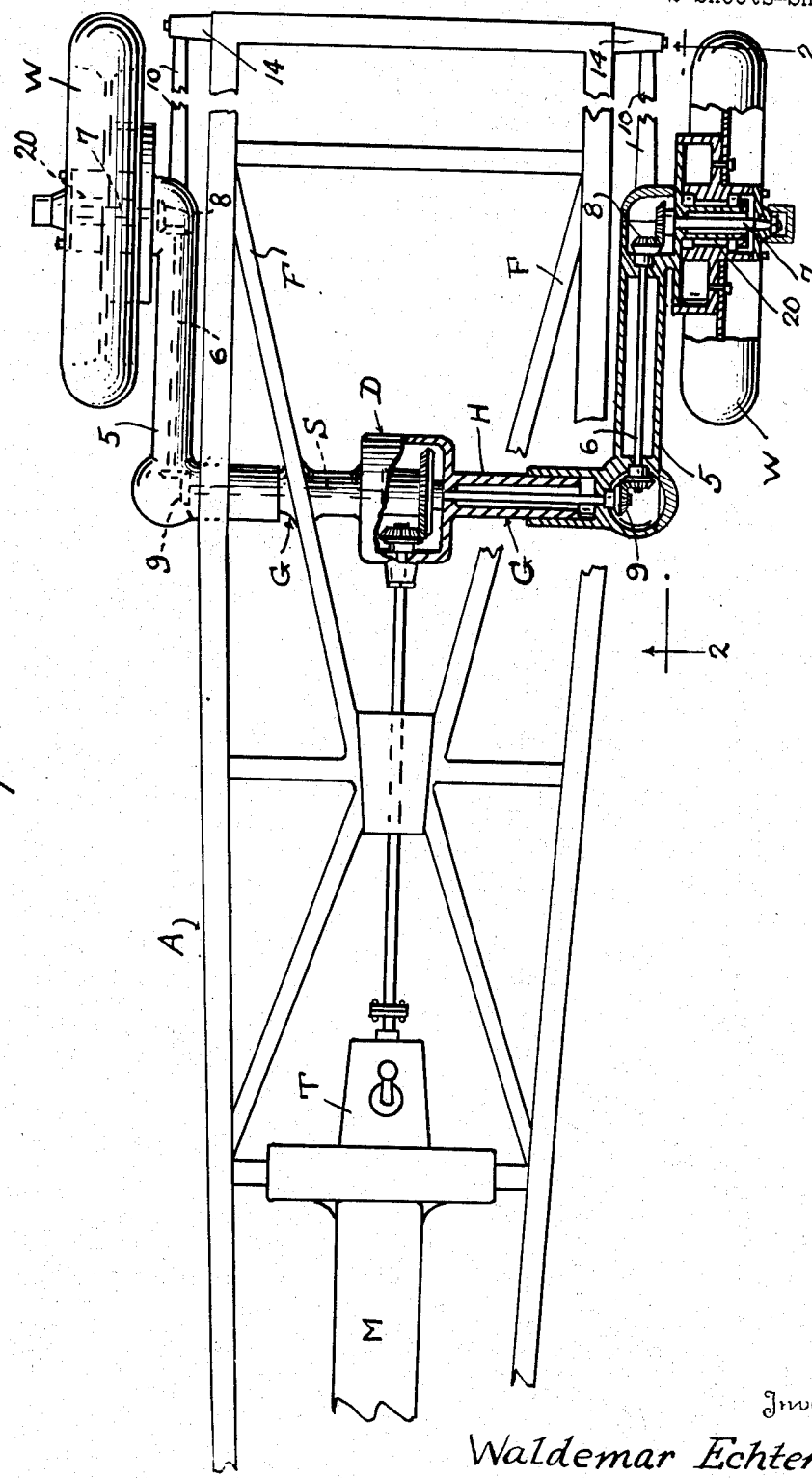

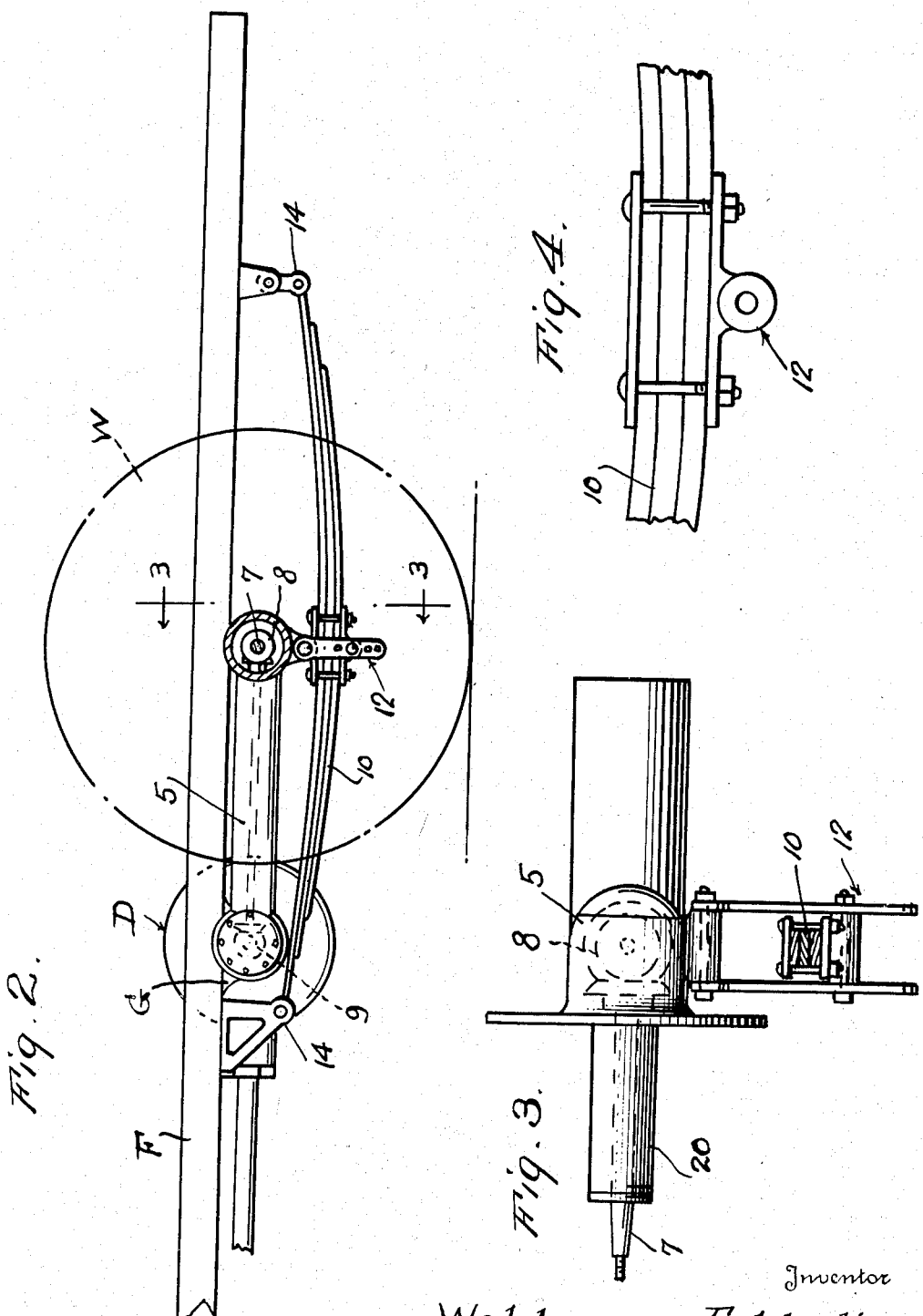

2,070,526

UNITED STATES PATENT OFFICE 2,070,526

INDIVIDUAL WHEEL SUSPENSION MECHANISM

Waldemar E. Echterling, Hammond, Ind.

Application March 16, 1936, Serial No. 69,200

3 Claims. (Cl. 180—73)

This invention relates to vehicles and more particularly to the wheel supporting means therefor.

The primary object of this invention resides in the provision of a vehicle embodying means whereby its wheels will function independently in perpendicular planes.

Another object of this invention resides in the provision of a vehicle consisting of an embodiment of elements adapted to have individually suspended wheels in controlled yieldable relation to the chassis of the vehicle.

A further object of this invention resides in the provision of a vehicle having its wheels mounted on the chassis of the vehicle in such manner that they not only function independently relative to one another but are adjustable to regulate the center of gravity of the vehicle.

A still further object of this invention resides in the provision of a vehicle of the power driven type having its power transmitting means rigidly secured to the chassis thereof and connected to driving wheels having independent movement in a vertical direction.

A further object of this invention resides in the provision of a vehicle having its ground wheels mounted, relative to the differential mechanism of the vehicle, so as to utilize the axis of the differential driving shaft as a fulcrum for independent vertical movement of the wheels at a point remote from the aforesaid lateral axis of the differential driving shaft.

Aside from the foregoing objects this invention relates to a vehicle embodying means whereby its wheels are permitted to function in vertical planes independently of one another and yet obviate lashing or side swaying of the vehicle while under way.

In addition to the aforesaid objects this invention resides in the provision of a vehicle, such as a trailer, which among other elements, consists of wheel suspending means adapted to not only permit independent vertical action of the same but to afford ready adjustment of the wheels relative to the chassis of the vehicle so as to permit utilization of sets of wheels of different sizes without replacement of the suspension means or alteration of road clearance.

With these and other objects in view this invention resides in certain novel features of construction and arrangement of elements to be hereinafter fully set forth in the specification, illustrated in the accompanying drawings and pointed out in the appended claims and, while the disclosure depicts my present conception of the invention, the right is reserved to resort to such changes in arrangement and construction as come within the scope of the claims.

In the accompanying drawings forming a part of this application:

Fig. 1 is a plan view partly in section of the rear portion of an automobile chassis showing the elements of this invention mounted thereon.

Fig. 2 is a sectional view on line 2—2 of Fig. 1.

Fig. 3 is an enlarged sectional view on line 3—3 of Fig. 2.

Fig. 4 is an enlarged side view of a portion of one of the springs showing the shackle member secured thereto.

In the present embodiment of this invention the letter A designates the chassis of an automobile, which among other necessary adjuncts not shown embodies a motor M, a transmission T and differential mechanism D.

Since one of the salient features of this invention is to dispense with rocking motion of the differential mechanism relative to the remaining adjuncts of the chassis, the differential housing H thereof is secured to the frame F of the chassis as at G and thereby becomes a rigid part thereof, thus dispensing with the usual universal joints of the drive shaft.

Journaled on the free or outer ends of the differential housing H are hollow arms 5 which are preferably of right angular configuration and are adapted to support therein power transmitting shafts 6 and 7 connected by suitable gears 8. The latter mentioned shafts are suitably journaled in bearing sleeves 20 formed on the hollow arms 5 and project outwardly beyond said sleeves where their extremities are splined and secured to drive wheels W. Through the instrumentality of mounting the wheels on the sleeves 20 and securing them to the shafts 5 as above stated, the weight of the vehicle is carried by the sleeves thus relieving the shafts 7 of the weight of the vehicle and permitting them to function as drive shafts only.

The shafts 6 are connected to the laterally extending shafts S of the differential mechanism D as by beveled gears 9 to permit the arms 5 to oscillate around the axis of said shafts S.

With the aforesaid elements assembled as shown, it is apparent power from the motor M will be transmitted to the differential mechanism D obviating the usual rocking motion prevailing between the conventional differential and transmission mechanism and permit oscillatory movement of the arms 5 from the axial point of the differential drive shafts and, to control the actuation of the wheels mounted on the arms, springs 10 are shackled to the arms 5 as at 12 and journaled at their free ends to the chassis frame as at 14.

Through the instrumentality of adjustably connecting the springs to the arms as at 12, the wheels of the vehicle can be supplemented for other sizes without altering the center of gravity of the vehicle.

Where the aforesaid suspension means are utilized on trailers or other similar vehicles, the driving shafts are eliminated, the arms 5 being similarly mounted to yieldingly oscillate on axes remote from the spindles of the wheels.

With this invention fully set forth it is apparent that means are provided to accomplish the aforesaid and other objects and, through the simplicity of the same, the cost of manufacture will be reasonable.

Having thus fully described my invention what I claim and desire to protect by Letters Patent is:

1. The combination with the differential driving mechanism of a motor vehicle, a housing enclosing the same and having laterally extending tubular ends, means retaining the housing in stationary position relative to the frame of the motor vehicle, substantially right angular tubular arms rotatably mounted on the free ends of the housing, tubular sleeves formed on the extremities of the tubular arms, said tubular arms being freely slidable on said housing, drive wheels mounted on the tubular sleeves, driving shafts within the aforesaid tubular elements and connecting the differential mechanism to the wheels, bevel gears connecting the drive shafts at their intersections, and resilient means connecting the tubular arms to the frame of the vehicle, said resilient means being arranged to resist movement of the tubular arms longitudinally of the housing and serving as the sole means for holding said arms on said housing.

2. The combination with the differential driving mechanism of a motor vehicle, a housing secured to the frame of the vehicle and having laterally extending tubular extremities, right angular tubular arms rotatably mounted on the extremities of the housing, said tubular arms being freely movable longitudinally of the housing, right angular tubular sleeves formed on the free ends of the arms and disposed in a plane parallel with the laterally extending tubular arms of the housing, wheels rotatably mounted on the sleeves, shafts journaled in the aforesaid tubular elements and forming connections between the differential mechanism and wheels, power transmitting means connecting the shafts at their points of intersection, and springs shackled to the arms and frame of the vehicle, said springs being arranged to resist movement of the first arms longitudinally of the housing and serving as the sole means for holding the first arms on the housing.

3. In a vehicle drive, a frame, a differential housing fixed to said frame and having lateral tubular extensions, tubular arms mounted on the ends of said extensions and having free longitudinal and swinging movement relative to said extensions, wheels supported by the free ends of said arms, driving means for said wheels extending from the housing through said extensions and arms, and means to prevent movement of the arms longitudinally of the housing and to permit swinging movement of said arms on said housing, said means consisting of a pair of leaf springs each having its middle portion shackled to a respective arm and its ends shackled to said frame.

WALDEMAR E. ECHTERLING.